US011352530B2

(12) United States Patent
Sciascia et al.

(10) Patent No.: US 11,352,530 B2
(45) Date of Patent: Jun. 7, 2022

(54) VACUUM INSULATING GLAZING (71) Applicant: SAES GETTERS S.P.A., Lainate (IT)

(72) Inventors: Calogero Sciascia, Milan (IT); Omar Saoncella, Casale di Scodosia (IT); Stefano Rebughini, Lecco (IT); Federico Gallino, Besnate (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 17/614,427

(22) PCT Filed: Jun. 18, 2020

(86) PCT No.: PCT/IB2020/055733
§ 371 (c)(1),
(2) Date: Nov. 26, 2021

(87) PCT Pub. No.: WO2020/255031
PCT Pub. Date: Dec. 24, 2020

(65) Prior Publication Data
US 2022/0145145 A1 May 12, 2022

(30) Foreign Application Priority Data

Jun. 21, 2019 (IT) .................. 102019000009759

(51) Int. Cl.
*C09J 163/04* (2006.01)
*C08G 59/50* (2006.01)
(Continued)

(52) U.S. Cl.
CPC .............. *C09J 163/04* (2013.01); *C03C 27/10* (2013.01); *C08G 59/3218* (2013.01); *C08G 59/504* (2013.01); *C08K 3/22* (2013.01); *C08K 3/36* (2013.01); *C09J 5/06* (2013.01); *C09J 11/04* (2013.01); *E06B 3/6612* (2013.01); *E06B 3/66333* (2013.01); *E06B 3/6733* (2013.01); *E06B 3/6736* (2013.01); *E06B 3/6775* (2013.01); *F25D 23/065* (2013.01); *C08K 2003/2206* (2013.01); *C08K 2003/343* (2013.01); *C08K 2201/014* (2013.01); *C09J 2463/00* (2013.01); *E06B 3/66304* (2013.01); *E06B 2003/66338* (2013.01)

(58) Field of Classification Search
CPC ........ C08L 63/00–10; C09D 163/00–10; C09J 163/00–10; C08J 2363/00–10; C08G 59/00–72; E06B 3/6612; E06B 3/66328; E06B 3/6715; E06B 3/677; E06B 3/6775; Y02A 30/249; Y02B 80/22
See application file for complete search history.

(56) References Cited

FOREIGN PATENT DOCUMENTS

EP 1794404 A2 6/2007
EP 2508546 A1 10/2012
JP 2003089557 A * 3/2003

OTHER PUBLICATIONS

International Search Report and Written Opinion dated Nov. 6, 2020 in PCT/IB2020/055733, 12 pages.

* cited by examiner

*Primary Examiner* — Kregg T Brooks
(74) *Attorney, Agent, or Firm* — Element IP, PLC (57) ABSTRACT

The present invention refers to a Vacuum Insulating Glazing (VIG) able to provide excellent thermal insulation to the transparent components of curtain walling systems in buildings and to cabinets for domestic or commercial refrigerators, and to a process for its manufacture.

20 Claims, 3 Drawing Sheets (51) Int. Cl.
*C08K 3/22* (2006.01)
*C08K 3/36* (2006.01)
*C09J 5/06* (2006.01)
*C09J 11/04* (2006.01)
*E06B 3/66* (2006.01)
*E06B 3/663* (2006.01)
*E06B 3/673* (2006.01)
*E06B 3/677* (2006.01)
*F25D 23/06* (2006.01)
*C03C 27/10* (2006.01)
*C08G 59/32* (2006.01)
*C08K 3/34* (2006.01)

VACUUM INSULATING GLAZING

The project leading to this application has received funding from the European Union's Horizon 2020 research and innovation programme under grant agreement No 723868.

FIELD OF THE INVENTION

The present invention refers to a novel Vacuum Insulating Glazing (VIG) system that provides excellent thermal insulation to the transparent components in several applications, ranging from curtain walling systems in buildings to cabinets for domestic and commercial refrigerators, and to a process for the manufacture of said VIG.

STATE OF THE ART

A conventional Vacuum Insulated Glazing (VIG) consists of two parallel plane sheets of glass kept separated through interposed spacers and sealed together along the edges, and containing a narrow, evacuated space created by spacers placed between the two sheets of glass. A getter, that is known to be able to absorb residual gases or impurities in vacuum tubes, has also been disclosed for inclusion in VIG devices in order to absorb or bind residual impurities and gases that may remain in the evacuated space between the glass sheets after sealing (i.e. outgassing process) or that may permeate within from the outside environment (i.e. permeation process).

The VIG devices have been described for the first time in patent literature in 1913 but, despite the simplicity of the concept and many decades of research since then, the first VIG device was actually made only in 1989, while a first commercial version appeared on the market not earlier than 1996. The VIG devices represent a typical example of how ideas come much earlier than their practical realization, since many technical aspects hinder the realization of a practical working device. Among the critical elements for the success of VIG devices, the material, shape and positioning of spacers can be mentioned, as well as the material and processing of the edge sealant; the quality of the glass and its coatings, usually providing low emittance and anti-reflective properties; and ports, tube and process for VIG evacuation.

On the other hand, it is ever more felt in both domestic and commercial buildings the need to increase the energy efficiency of buildings, by improving at the same time the thermal insulation and the transparency of the external walling with more and larger glasses. Therefore, the construction industry is striving to have available more efficient VIG devices for use in buildings.

In order to preserve the thermal insulation of a VIG device, a high vacuum level ($10^{-3}$ Torr or lower) has to be maintained: the lesser is the atmospheric gases permeation into the sealed space in the device from the external environment, the lower will be the pressure within the inner evacuated space. Glass and metals are materials with negligible permeation rates, thus at first glance they can be considered as perfect barriers, but this is not true for polymeric materials that, at different extent, are prone to gas permeation. In this sense, the use of glass frit or soldered metallic strips provides a hermetic edge sealant and the pressure evolution in the VIG device comes only from the outgassing process. This allows for a lower getter amount, usually one or two non-evaporable getter (NEG) sintered pills, or few square centimeters of evaporable Barium. On contrary, polymers are by definition semi-permeable materials and their use as VIG edge sealant needs the management of a larger gas amount due to both outgassing and permeation process that risk to overcome the maximum acceptable sizing of any getter solutions. In this sense, it was generally recognized that polymers could not satisfy the strict gas permeability requirements of the VIGs applications, as also confirmed by the statements in 2017 of Professor Collins, considered the father of modern VIGs: "All currently available polymer materials are far too permeable for this application. In the author's opinion, this is unlikely to change." [See Conference Proceedings of Glass Performance Days GPD 2017, pp 264-267]. The use of conventional polymer materials as sealants in VIG devices seemed therefore not feasible.

At a certain extent, it is known that a getter system may be useful in handling the atmospheric gases by absorption of $N_2$, $O_2$, $CO_2$, CO and $H_2O$; but a large gas permeability cannot be borne and would result in an unfeasible load for the getter. Moreover, since noble gases cannot be gettered and Ar accounts for $\approx 1\%$ v/v of the total atmospheric composition, the target of barrier properties for a VIG application is defined by the sealant Ar permeability, sufficiently low to guarantee an Ar pressure evolution inside the VIG not exceeding $10^{-3}$ Torr in the whole VIG service life. Depending on the VIG dimensions and the seal edge width, this target Ar permeability may be estimated in the range of $10^{-2} \div 10^{-3}$ barrer. So far, commercial polymers used as secondary sealants in insulating glasses have an Ar permeability one-two orders of magnitude higher than the target for VIG. More efficient solutions are therefore required in order to provide VIG devices enabled by polymer-based sealants.

The European patent application publication No. 2576950 discloses a VIG unit, for which it is suggested the use of an organic adhesive sealant, but provided with an inorganic coating. This document states that "no known adhesive or epoxy is impermeable enough to prevent the ingress of atmospheric gases into the cavity of a VIG unit during its life". In fact, this application claims for a "highly hermetic coating disposed over the adhesive layer, where the coating is an inorganic layer".

The US patent application publication No. US2007178256 also claims for organic gas sealants, but it just refers to insulated, non-evacuated glass that uses a low thermal-conductivity gas filling to provide insulation. Insulating glasses (IGs) that use filling gas are spread diffused on market, but they are a completely different category of devices from VIGs, having much worse thermal performances than VIGs and a much simpler production process.

As far as the Applicant is aware of, the only patent documents describing the use of organic material in edge sealing of VIG devices are patents No. CN107285650 and No. EP1794404. In particular, the European patent No. EP1794404 describes the use of epoxy materials, acrylate materials, butyl materials, polyurethane materials, polysulfide materials, acrylic materials and mixtures thereof as organic material for the sealant. No further information or suggestion is provided in EP1794404 about permeability to gases of the resulting VIG device, but in literature for best-in class materials, i.e. epoxy composite, a permeability for Ar in the range of 0.1-0.6 Barrer is reported. Other mentioned families of sealants, such as butyl rubbers, are reported to exhibit a permeability for Ar in the range 0.85-1.1, while for polysulfide materials 0.8-1.5, and acrylate and polyurethane are typically even more permeable [L. K. Massey, Permeability properties of plastics and elastomers: a guide to packaging and barrier materials, William Andrew, 2003].

Even more critical is the case for other atmospheric gases: $O_2$ and $N_2$ typically have a permeability of the same order of the Ar, but they are at one to two orders of magnitude more abundant, thus their penetration is correspondingly higher. Even worst is the case of water vapor that shows typically a larger permeation rate (typically expressed as Water Vapour Transmission Rate (WVTR)) with respect to other permanent gases, with a consequent pressure's rise within the cavity and loose of thermal performances.

Even very performing epoxy resins sealant formulations, such as the ones described in the International patent application publication No. WO 95/26997 would not be able to withstand in VIGs application. In particular, this kind of formulations is disclosed as able to reduce the permeability of gases, such as carbon dioxide and/or oxygen through packaging materials, while no reference is made to sealing of evacuated chambers or of VIG devices. In fact, according with the declared permeation values, the resin by itself should not be able to keep a sufficiently low gas permeation into the VIG. As mentioned above, one of the problems in using polymers and organic materials in VIG applications is that they typically have a water content overpassing 1% w/w and they generate outgassing products, primarily water molecules that, if not eliminated, would cause the vacuum pressure to rise above service pressure in the space between the glass sheets.

Similar considerations can be applied to CN107285650 that discloses a sealant composition for air-tight tempered glasses containing a silicon resin sealant, a catalyst and graphene microparticles. As a matter of fact, silicon resins are known to be very permeable to gases, several orders of magnitude worse than the above-mentioned epoxy resins as disclosed, for example, in "The behaviour of water in poly(dimethylsiloxane)" J. M. Watson, M. G. Baron, *Journal of Membrane Science* 110 (1996) 47-57.

Therefore, none of the known materials disclosed in the prior art above would be able to mark the target of providing an energetically efficient sealant for VIG devices, which is therefore a still much felt need. The mechanical properties are another sealant feature of paramount importance. In fact, the sealant must provide a glass adhesion strength and a yield stress higher than the maximum shear stress that could be generated by the glass temperature lift (e.g. for a 2.5 m by 1.5 m glass panes estimated maximum stress: 7 MPa). Moreover, the sealant must be rigid enough to avoid significant sliding between glass panes that would result in pillars movement.

Subject of the present invention is therefore a Vacuum Insulating Glazing (VIG) that solves the technical problems highlighted above for the known VIG devices, providing excellent thermal insulation performance and structural reliability thanks to exceptional edge barrier properties and mechanical strength, respectively.

A further subject of the present invention is a window or a façade potentially used also as door and/or skylight element in buildings or in greenhouse agricultural farming and/or as flat widows for vehicles such as automobiles, high-speed rail and aircrafts, comprising the above said vacuum insulating glazing.

Still a further subject of the present invention is a cabinet for domestic and/or commercial refrigerators comprising the above said vacuum insulating glazing, (e.g. freezers, wine cabinet, display cases).

Still a further subject of the present invention is a process for the manufacture of the above said Vacuum Insulating Glazing that may be at least partially automated and allows obtaining the VIG device with a suitable sealing edge. The latter means a homogeneous deposit, without voids or bubbles, and straight contours without spreading issues that may appear in the thermal curing process with sealant viscosity decreasing at increasing temperatures.

These and further subjects are achieved by the vacuum insulating glazing device, and the process for its manufacture according to the present invention, whose essential features are defined in the independent claims here attached. Further important characteristics of the subjects according to the invention are defined in the dependent claims.

BRIEF DESCRIPTION OF THE FIGURES

The characteristics and advantages of the vacuum insulating glazing and of the process for its manufacture according to the present invention, will be clearly illustrated in the following exemplary and not limiting description of their embodiments, also with reference to the attached figures wherein.

DETAILED DESCRIPTION OF THE INVENTION

As said above, the aim of the present invention is to provide an improved Vacuum Insulating Glazing (herein also indicated as "VIG") first of all from the point of view of the thermal insulation and energetic efficiency.

Now the Applicant has developed a novel device based on the Vacuum Insulating Glass technology, which is able to provide an excellent thermal insulation and barrier to gas permeability thanks to an innovative system involving the use of both a getter and a special sealant composition.

Figure 1:
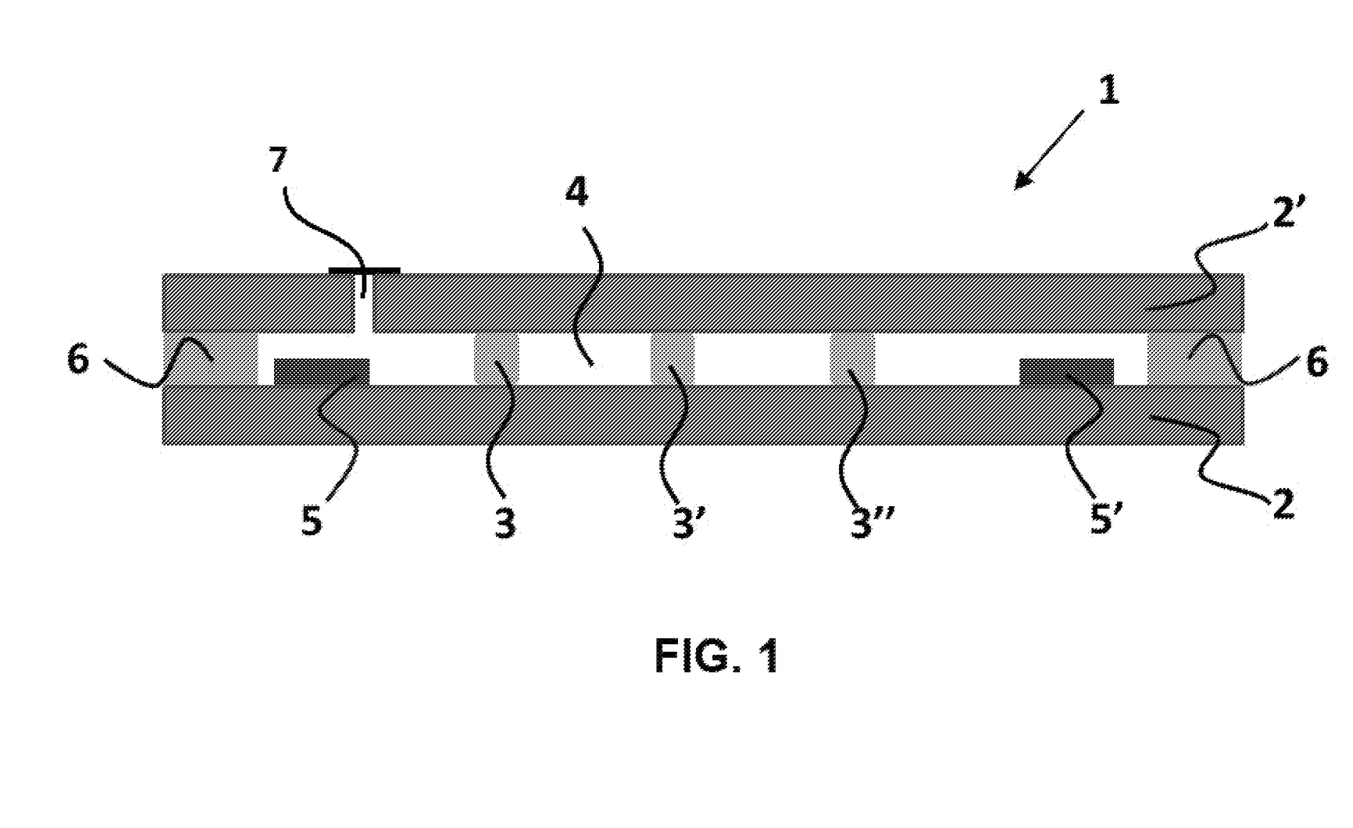
FIG. 1 shows schematically a preferred embodiment of the present vacuum insulating glazing and the main components thereof.

With particular reference to FIG. 1, a preferred embodiment of a vacuum insulating glazing 1 according to the present invention is illustrated, wherein two glass panes 2 and 2' facing one another are spaced apart from one another by a plurality of pillars 3, 3', 3" . . . , so as to create a void volume 4 therebetween. Pillars 3, 3', 3" . . . have to be placed in between the glass panes 2 and 2' to maintain them at a predetermined distance imposed by the pillar's height. Preferably pillars are equally distributed over the whole glass surface; their number may vary depending on how large is the surface and can be easily established by any person with ordinary skills in the art.

According to a particular embodiment of the present invention, the glass panes 2 and 2' in the present VIG device are tempered glasses, with at least one of the surfaces covered by a low emissivity layer facing to the inner volume 4 of the VIG. The lateral size of the glass panes 2 and 2' are typically comprised between 0.25 and 3 m, with the thickness of the pillars 3, 3', 3" . . . ranging from 0.1 to 0.6 mm.

To seal off the void volume 4, in the present VIG device, a polymer-based sealant 6 is deposited on the edges of the glass panes so as to define an inner, closed space between the glass panes 2 and 2'. After curing, taking into account the typical size details of the present VIG, a corresponding preferred width of the sealing edge along the VIG perimeter is comprised between 5 and 35 mm.

The sealing edge 6 in the present VIG device is obtained by deposition and curing of a sealant composition comprising:
   (a) a curable thermosetting non-halogenated polyepoxide resin comprising in average at least two epoxy groups per molecule;
   (b) an aromatic diamine curing agent in amount sufficient to provide from 0.5 to 2.0 equivalents of amine N—H per equivalent of epoxy groups in the epoxy resin, preferably from 0.5 to 1.0 equivalents; and
   (c) an inorganic dryer in amount ranging between 5% and 25% by weight with respect to the total weight of said sealant composition.

According to a preferred embodiment of the present invention, the non-halogenated polyepoxide resin in the present sealant composition is a phenol-formaldehyde resin or polyphenol diglycidyl ethers also known as Novolac resins, and more preferably it has the following formula (I):

wherein n is an integer comprised in the range between 0 and 8.

As the curing agent, the aromatic diamine in the present sealant composition preferably comprises sulphonated and/or phenol groups, and more preferably is 4,4'-diaminodiphenylsulphone.

The present sealant composition as above described has preferably a glass transition temperature higher than 100° C. and more preferably higher than 150° C. as determined by differential scanning calorimetry (DSC) measurements according to ISO 11357-2:2013.

As disclosed by the European patent application publication No 2576950, the present sealant composition can be used in combination with other sealant elements suitable to reduce even more the permeation gas load, essentially working on geometrical factors: it can be possible to add a peripheral impermeable frame (such as a metallic or glassy or ceramic U shaped profile clamping the assembly) glued with the present sealant composition on the outer VIG edge or at least on a portion of it. In such configuration, the permeation can be reduced and even when the width of the sealant should be considerably lowered for aesthetical or technical reasons.

According to the present invention, a non-evaporable getter system, indicated in FIG. 1 as 5 and 5', is placed within the void volume 4, created between the glass panes 2 and 2'.

In a particular embodiment of this invention, the non-evaporable getter is a Zr alloy having a $N_2$ absorption capacity ≥1 cctorr/g measured by ASTM absorption test at room temperature. As a Zr alloy of possible use in the getter of this invention, an alloy selected from the group consisting of ZrTiV, ZrTiVAl, ZrVAl, ZrVFe, and ZrVFeMn-RE, wherein RE is one or more rare earth elements, optionally sintered in mixtures comprising Zr powders. Even though, pills, such as a getter alloy like TiVFeAlSi, can be usefully be selected and used, preferred according to this invention are powder getters laminated on metal strips or coated on metal tapes, the getter being deposited on one side or on both sides of the metal support. Typically, the metal support for the getter is 5-20 mm large and 0.05-0.3 mm thick, with an amount of active getter material loaded on the support ranging for instance between 10 and 30 mg/cm.

FIG. 1 shows also the presence of an evacuation hole 7 in at least one of the glass panes 2 or 2", that is required by the most common manufacturing processes of VIGs devices.

Figure 2:
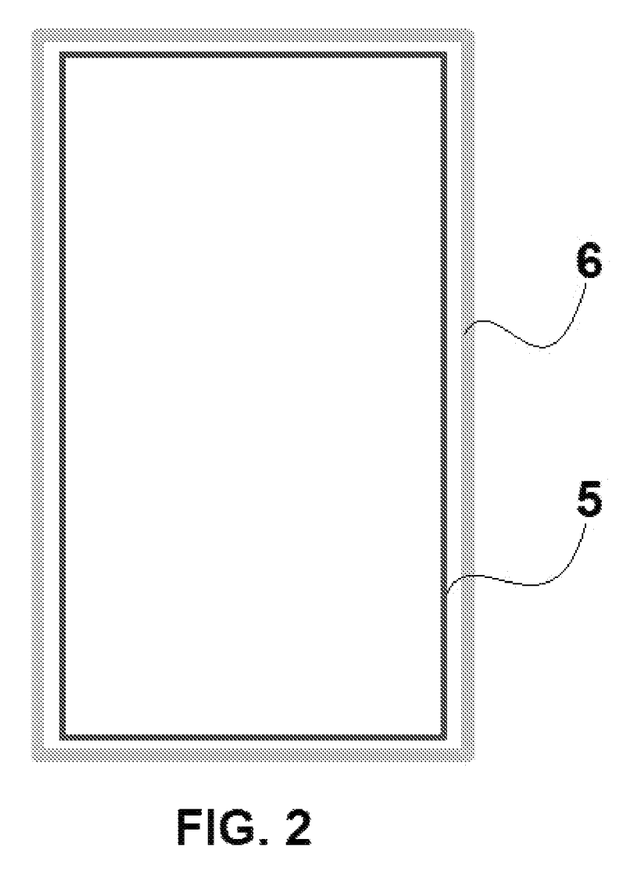
FIG. 2 is a sketch of the VIG preferential design with a getter full frame of four strips and equal sealing edge widths.

The simplest VIG configuration according to the present invention is reported in FIG. 2 with the maximum amount of getter and consisting in four getter strips positioned in a full second frame close to the sealant.

Figure 3:
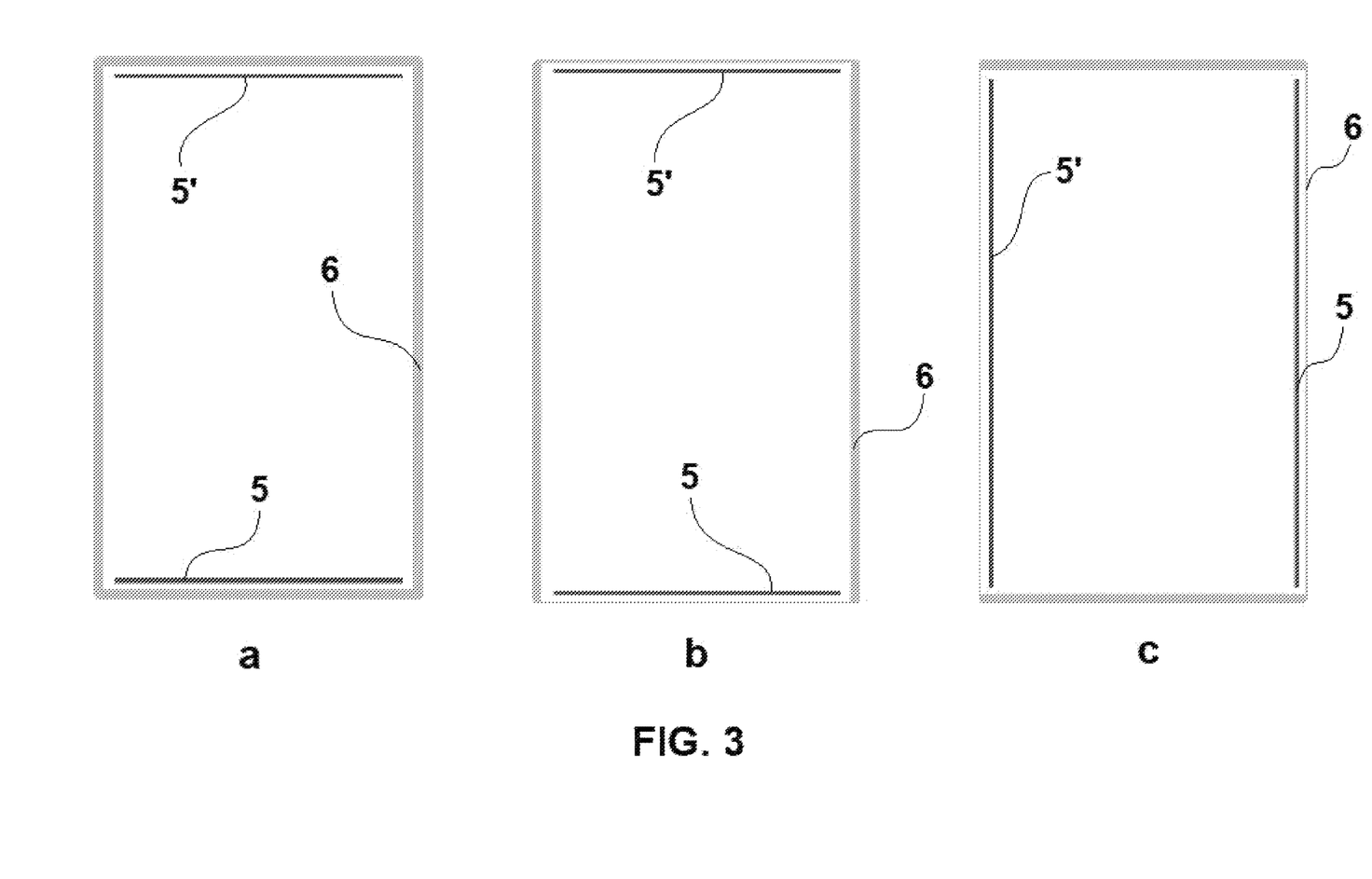
FIGS. 3a, 3b and 3c show alternative VIG designs with only two getter strips and different sealing edge widths.

In FIGS. 3a to 3c alternative designs of a VIG according to the present invention are shown, with a lower number of getter strips contained in them with respect to the design in FIG. 2. These alternative designs have two strips on two different edges in order to simplify the activation process. By reducing the number of strips, we lose the symmetry that can result in asymmetric total edge widths (FIG. 3a) or in asymmetric sealant widths (FIGS. 3b and 3c). Designs of FIGS. 3b and 3c are equivalent and they differ in the location of getter strips, on the short edges for design of FIG. 3b and on the long edges for design of FIG. 3c.

In the case of asymmetric sealant widths, the deposition process could be carried out by choosing a sealant curb equivalent to the narrow sealant deposit and by using multiples of that curb to produce the wide sealant deposits.

The inorganic dryer in the present sealant composition can be selected from irreversible dryers, such as CaO, other oxides, perchlorate dryers, and hygroscopic salts or from reversible dryers, such as zeolites or active carbon or a mixture thereof.

According to a particular embodiment of this invention the present sealant composition further comprises one or more passive fillers, that may be organic or inorganic fillers, such as poly(vinyl alcohol) (PVOH), polyimides, $SiO_2$, $TiO_2$, glass beads, glass fibers that may be either chopped or in strain form, metal or glass ribbons, and metal or glass wires.

In the following Table 1, exemplary weight percentages of the components in the present sealant composition are described.

TABLE 1 exemplary composition of the polymer-based sealant

| Component | Function | Additive size (μm) | Composition Range % [w/w] |
|---|---|---|---|
| Phenol-formaldehyde resin (Novolac) | Matrix | — | 75-60 |
| 4,4'-diaminodiphenyl sulfone (Dapsone) | Curing Agent | <63 | 25-40 (% eq/eq: 0.5-1) |
| Reversible: Zeolites e.g. LTA-Na, FAU 13X; Irreversible: e.g. CaO | Dryer | <10 | 5-30 |
| Organic: e.g. PVOH Inorganic: e.g. $SiO_2$, glass beads, $TiO_2$ | Passive Filler | <10 | 0-50 |

In addition, subject of this invention is a process for manufacturing a vacuum insulating glazing comprising the steps of:
   i) providing a top and a bottom glass pane, and preparing said bottom glass pane by the following steps a to c in any order, not necessarily in the order they are reported below:

a. positioning of pillars;
b. positioning of a non-evaporable getter system on the glass surface (e.g. in the case of getter strips) or in a dedicated space (e.g. drilled hole for getter pills) and optionally glue the getter in order to avoid its movement during the pairing operation;
c. depositing a sealant composition as described above;

ii) pairing the top glass pane on the bottom glass pane;
iii) curing the sealant preferably by heating and optionally also by UV curing;
iv) pumping out the VIG chamber preferentially under baking to improve vacuum conditions;
v) activating the getter, preferentially by radio-frequency (RF) heating in a temperature range of 300° C.-600° C.
vi) sealing of the evacuation hole.

The sealant deposition can be carried out by means of traditional deposition techniques, e.g. needle dispensing by deposition of the sealant composition from pre-filled syringes, or by positioning pre-formed laminated strips of the sealant composition.

According to an aspect of the present invention, the curing step iii) is carried out at about 200° C. for 1 hour.

In another aspect of the present invention the curing step iii) is carried out at about 170° C. for 1 hour.

In a particular embodiment of the present manufacturing process, the steps i) and ii) above may be performed in a large evacuated chamber enclosing the entire VIG, without the need for a subsequent pumping out.

Advantages of the present invention are linked to the high energy efficiency and thermal insulation obtained thanks to the present vacuum insulating glazing with both a getter and the above described sealing edge. The present VIG device has shown high barrier properties towards atmospheric gases and moisture too thanks to the presence of a dryer comprised in the sealant composition, not separated from it in the inner volume 4 of the VIG device. The present sealant compositions have been tested as illustrated in the following experimental part, and found that they are able to yield vacuum grade under any of the aging protocols tested, while the comparison compositions fail, especially for longer time aging.

Moreover, the presence of the dryer in the sealant formulation allows reaching the same high efficiency with a lower amount of getter or alternatively with the use even in conditions of a not fully-activated getter according to the temperature limits imposed by the VIG production process.

Further advantages of the present VIG device are its mechanical properties too: the present VIG device, and in particular its sealing edge, is in fact able to accommodate the large stress due to the pressure difference between the inner volume 4 and external atmosphere. It is also able to accommodate the different thermal dilation between inner and outer glass panes, as well as to sustain, at the end of the manufacturing process, outgassing procedures at temperatures higher than 100° C., but below the sealant $T_g$, to remove the gases and moisture from the inner volume of the VIG device. High yield stress and adhesion strength on glass surfaces (>7 MPa) of the present devices are shown in the following experimental part following lap-shear tests, in comparison with devices comprising different sealant compositions.

Furthermore, as regards to the present process for manufacturing the vacuum insulating glazing, advantages are shown by the present sealant edge in particular in that it has a curing temperature below 250° C. and a glass transition temperature higher than 100° C. Moreover, it was observed that no gaseous species is released during polymerization.

Finally, a further important advantage of the present invention is that the process for the manufacture of the present VIG device is simple and cost-effective.

EXPERIMENTAL PART

Some representative VIG samples, subjected to different aging protocols (see Table 2), have been tested in terms of pressure evolution which ultimately affects the thermal properties.

TABLE 1

Aging protocols.

| Aging Protocols | Time (days) | Temperature (° C.)/Relative Humidity (%) |
|---|---|---|
| A | 1 | 25°/90% |
| B | 15 | 25°/90% |
| C | 30 | 25°/90% |

A VIG size of 300 mm×300 mm has been chosen with sealing edge width of 1 cm and a vacuum gap of 0.25 mm.

Sealant Samples A, B and C with formulations of the present invention are reported in Table 2. Comparative sealant compositions 1, 2, 3, 4 and 5, wherein other resins have been used as sealants have been considered for comparison; they are also listed in the same Table 3 below. All these polymer-based sealants were tested after the above reported aging protocols and results have been reported in Table 3. All the tests were carried out with a fully-activated getter in the form of ZrVAl alloy laminated on both sides of 0.1 mm thick nickel-plated iron 8 mm-wide strips. For each VIG sample, four getter strips were used as illustrated in FIG. 2.

TABLE 2

Compositions of sealant sample investigated in the test examples

| | Component | Composition % (w/w) |
|---|---|---|
| Sample A | Phenol-formaldehyde resin | 67.5 |
| | 4,4' diaminodiphenyl sulphone | 22.5 |
| | calcium oxide | 10 |
| Sample B | Phenol-formaldehyde resin | 67.5 |
| | 4,4' diaminodiphenyl sulphone | 22.5 |
| | Zeolites LTA | 10 |
| Sample C | Phenol-formaldehyde resin | 62.8 |
| | 4,4' diaminodiphenyl sulphone | 20.9 |
| | calcium oxide | 9.3 |
| | silicon dioxide | 7 |
| Comparative 1 | Phenol-formaldehyde resin | 75 |
| | 4,4' diaminodiphenyl sulphone | 25 |
| Comparative 2 | Bisphenol F | 73.75 |
| | 4,4' diaminodiphenyl sulphone | 26.25 |
| Comparative 3 | Polysulfide | 100 |
| Comparative 4 | ethylene-octene copolymer | 50.5 |
| | calcium oxide | 33 |
| | Silicon dioxide | 16.5 |
| Comparative 5 | polydimethylsiloxane | 100 |

The measurements on the samples illustrated above were carried out by monitoring the total pressure evolution by spinning rotor gauge (SRG). Despite the fact SRGs are considered high accuracy transfer standard for high vacuum pressure measurements, they need a gas-dependent calibration factor, that at the moment is not known being the permeants mixture unknown [see for instance NIST Special Publication 250-93 "NIST Calibration Services for Spinning Rotor Gauge Calibrations" by Robert F. Berg and James A. Fedchak and the handbook from MKS at https://www.mksinst.com/f/srg-3-spinning-rotor-vacuum-gauge-system].
For this reason, the results are reported in the following Table 4 in comparative terms of vacuum grade quality:
+ means high vacuum, i.e. pressure $\leq 10^{-3}$ mbar;
≈ means medium pressure, i.e. in the range from $5 \cdot 10^{-3}$ mbar to $10^{-3}$ mbar, and
− means low vacuum range, i.e. pressure $\geq 5 \cdot 10^{-3}$ mbar.

TABLE 3

Vacuum grade results for different polymer-based sealants undergoing different aging protocols.

| Sealant | Vacuum Grade | | |
| --- | --- | --- | --- |
| | Aging Protocol A | Aging Protocol B | Aging Protocol C |
| Sample A | + | + | + |
| Sample B | + | + | + |
| Sample C | + | + | + |
| Comparative 1 | + | ≈ | − |
| Comparative 2 | + | + | ≈ |
| Comparative 3 | + | ≈ | − |
| Comparative 4 | ≈ | − | − |
| Comparative 5 | − | − | − |

The results obtained show the excellence of the present sealant compositions over the comparison ones, the latter not being able to reach a high vacuum grade under all aging conditions tested, especially for longer times (aging protocol C). On the contrary, the sealant compositions of the invention are able to maintain high or medium vacuum grade even for longer times. In particular those of the present compositions comprising one or more oxide dryers show a high vacuum grade under any aging protocols.

All Samples and Comparative samples have been tested for their mechanical properties by lap-shear tests. Results are summarized in the following Table.

Data are collected based on ISO 4587:2013 "Adhesives—Determination of tensile lap-shear strength of rigid-to-rigid bonded assemblies"

TABLE 5

Lap shear tests for different polymer-based sealant compositions.

| Sealant | Adhesion strength (MPa) |
| --- | --- |
| Sample A | >7 |
| Sample B | >7 |
| Sample C | >7 |
| Comparative 1 | ≈2.4 |
| Comparative 2 | ≈4 |
| Comparative 3 | ≈1.2 |
| Comparative 4 | ≈1.5 |
| Comparative 5 | ≈2 |

These results confirm high yield stress and adhesion strength (>7 MPa) on glass surfaces, showing that the present sealant compositions fulfil the mechanical requirements for a VIG application.

The present invention has been described above with reference to its preferred embodiments, but further embodiments may exist, all comprised in a same inventive core, as defined by the scope of the attached claims.

The invention claimed is:
1. A vacuum insulating glazing comprising:
  two glass panes facing one another, and spaced apart from one another by one or more pillars so as to create a void volume therebetween;
  a non-evaporable getter system placed within said volume; and
  a polymer-based sealing edge sealing off said volume in order to define a closed space in between said glass panes,
  wherein said sealing edge is obtained by curing of a sealant composition comprising:
    (a) a curable thermosetting non-halogenated polyepoxide resin comprising in average at least two epoxy groups per molecule;
    (b) an aromatic diamine curing agent in amount sufficient to provide from 0.5 to 2.0 equivalents of amine N—H per equivalent of epoxy groups in the epoxy resin; and
    (c) an inorganic dryer in amount ranging between 5% and 25% by weight with respect to the total weight of said sealant composition.
2. The vacuum insulating glazing of claim 1, wherein said aromatic diamine curing agent amount provides from 0.5 to 1.0 equivalents of amine N—H per equivalent of epoxy groups in said epoxy resin.
3. The vacuum insulating glazing of claim 1, wherein said inorganic dryer is selected from the group consisting of oxides, hygroscopic salts and reversible dryers, or a mixture thereof.
4. The vacuum insulating glazing of claim 1, wherein said sealant composition further comprises one or more passive fillers.
5. The vacuum insulating glazing of claim 4, wherein said passive filler is selected from the group consisting of poly (vinyl alcohol), polyimides, $SiO_2$, $TiO_2$, glass beads, glass fibers, metal or glass ribbons, and metal or glass wires.
6. The vacuum insulating glazing of claim 1, wherein said non-halogenated polyepoxide resin is a phenol-formaldehyde resin.
7. The vacuum insulating glazing of claim 6, wherein said phenol-formaldehyde resin has the following formula (I):

wherein n is an integer comprised between 0 and 8.
8. The vacuum insulating glazing of claim 1, wherein said aromatic diamine curing agent comprises sulphonated and/or phenol groups.
9. The vacuum insulating glazing of claim 1, wherein said aromatic diamine curing agent is 4,4'-diamino-diphenyl sulphone.
10. The vacuum insulating glazing of claim 1, wherein said sealant composition has a glass transition temperature $T_g$, as determined by differential scanning calorimetry (DSC) measurements according to ISO 11357-2:2013, higher than 100° C.
11. The vacuum insulating glazing of claim 1, wherein said non-evaporable getter system comprises a Zr alloy having a $N_2$ absorption capacity by ASTM absorption test at room temperature ≥1 cctorr/g.
12. The vacuum insulating glazing of claim 11, wherein said Zr alloy is selected from the group consisting of ZrTiV, ZrTiVAl, ZrVAl, ZrVFe and ZrVFeMn-RE alloys, wherein RE is one or more rare earth elements, optionally sintered in mixtures further comprising Zr powders.

13. The vacuum insulating glazing of claim 1, wherein said non-evaporable getter system comprises a powder getter distributed on at least one side of a metal strip.

14. A window or facade comprising the vacuum insulating glazing as defined in claim 1.

15. A cabinet for domestic or commercial refrigerators comprising the vacuum insulating glazing as defined in claim 1.

16. A process for manufacturing a vacuum insulating glazing of claim 1, the process comprising the steps of:
 i) providing the two glass panes as a top and a bottom glass pane, and preparing said bottom glass pane by the following steps a to c in any order:
  a. positioning of the pillars;
  b. positioning of the non-evaporable getter system on the glass surface or in a dedicated space, and optionally gluing said getter; and
  c. depositing the sealant composition comprising:
   1) the curable thermosetting non-halogenated polyepoxide resin comprising in average at least two epoxy groups per molecule;
   2) the aromatic diamine curing agent in amount sufficient to provide from 0.5 to 2.0 equivalents of amine N—H per equivalent of epoxy groups in the epoxy resin; and
   3) the inorganic dryer in amount ranging between 5% and 25% by weight with respect to the total weight of said sealant composition;
 ii) pairing said top glass pane on said bottom glass pane;
 iii) curing said sealant composition, thus forming a VIG chamber;
 iv) pumping out said VIG chamber;
 v) activating said getter; and
 vi) sealing an evacuation hole.

17. The process according to claim 16, wherein said step i) c. is carried out by positioning pre-formed laminated strips of said sealant composition or by deposition of said sealant composition from pre-filled syringes.

18. The process according to claim 16, wherein said curing step iii) of the sealant composition is carried out by heating and optionally also by UV curing.

19. The process according to claim 16, wherein said getter activating step v) is carried out by radio-frequency (RF) heating in a temperature range of 300° C.-600° C.

20. The process according to claim 16, where said steps ii) and iii) of pairing said glass panes and curing said sealant composition are performed in a large evacuated chamber enclosing the entire VIG.

* * * * *